No. 884,765. PATENTED APR. 14, 1908.

G. SCHLEMMER.

FILTER.

APPLICATION FILED JAN. 29, 1908.

2 SHEETS—SHEET 1.

Witnesses:

Arthur E. Zumpe.

H. R. Schulz.

Inventor

George Schlemmer

By his Attorney

Frank v. Briesen

THE NORRIS PETERS CO., WASHINGTON, D. C.

No. 884,765. PATENTED APR. 14, 1908.

G. SCHLEMMER.

FILTER.

APPLICATION FILED JAN. 29, 1908.

2 SHEETS—SHEET 2.

Witnesses:

Arthur E. Zumpe

W. R. Schulz

Inventor

George Schlemmer

By his Attorney

Frank v. Briesen

THE NORRIS PETERS CO., WASHINGTON, D. C.

UNITED STATES PATENT OFFICE.

GEORGE SCHLEMMER, OF NEW YORK, N. Y.

FILTER.

No. 884,765. Specification of Letters Patent. Patented April 14, 1908.

Application filed January 29, 1908. Serial No. 413,149.

*To all whom it may concern:*

Be it known that I, GEORGE SCHLEMMER, a citizen of the United States, residing at New York city, Manhattan, county and State of New York, have invented new and useful Improvements in Filters, of which the following is a specification.

This invention relates to a filter for beer and other liquids, which is effective in operation and permits the filtering mass to be thoroughly loosened and washed whenever required.

Figure 1:
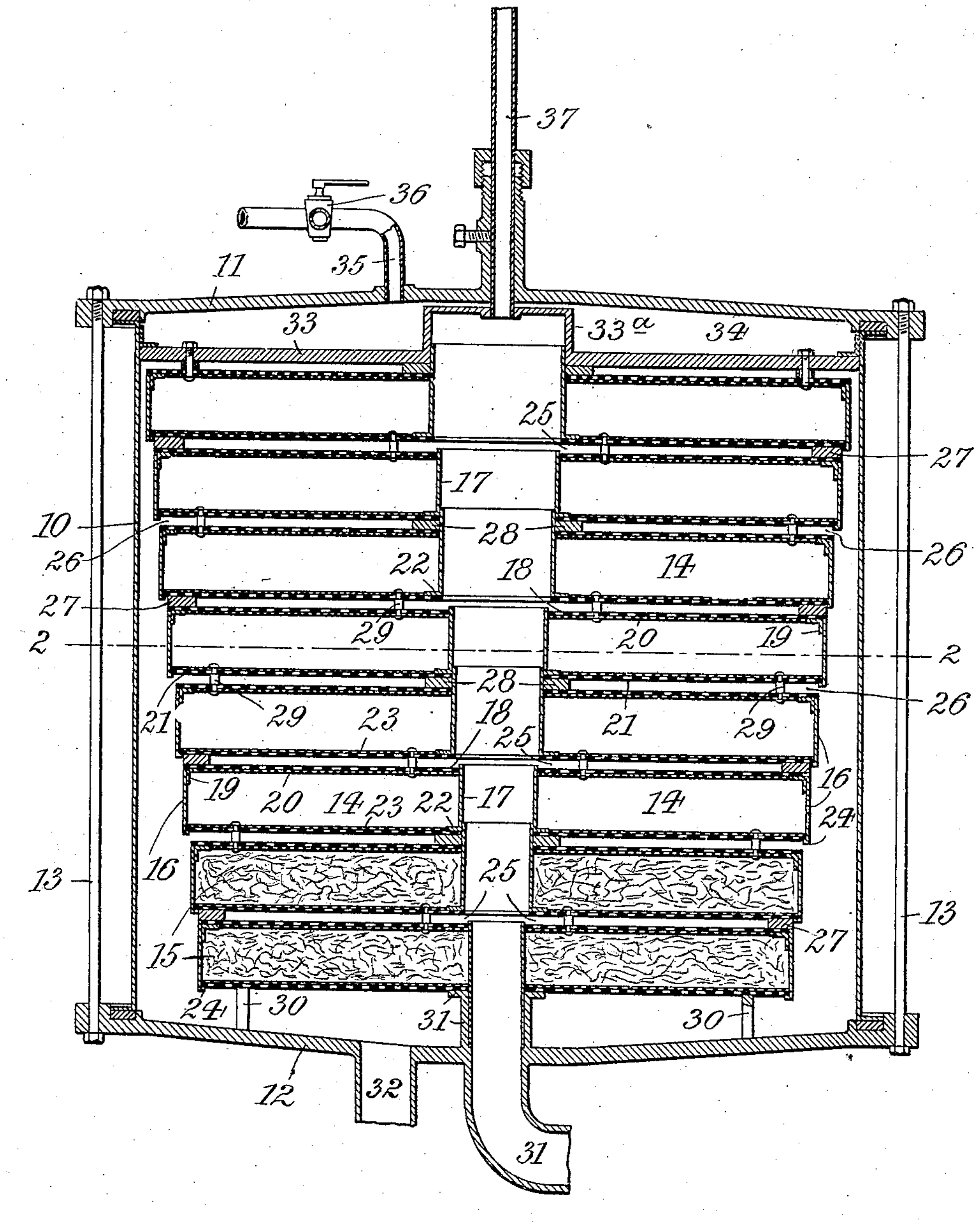
Figure 2:
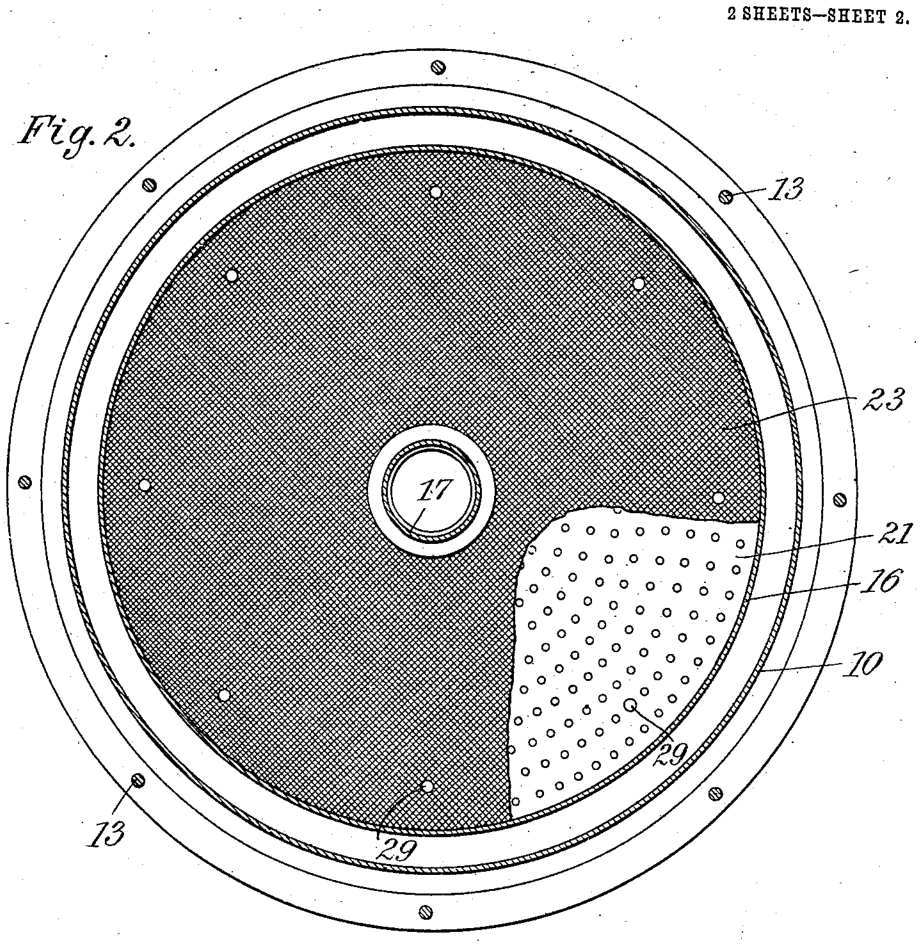
Figure 3:
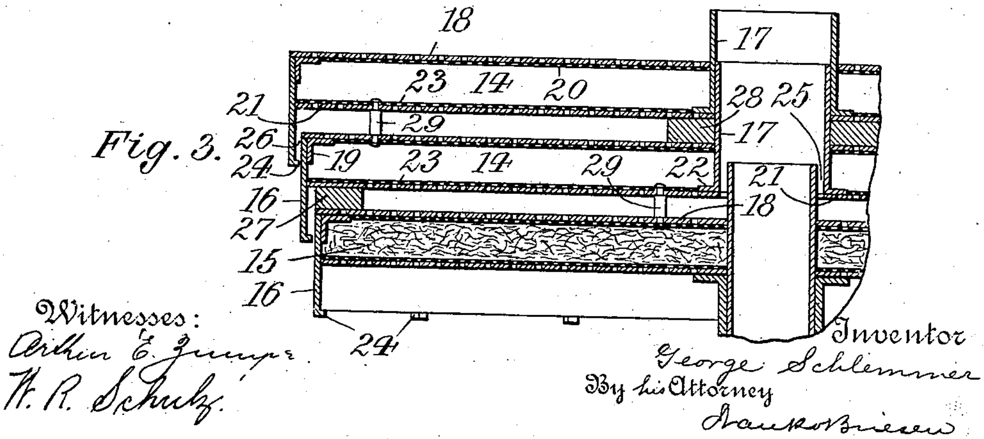

In the accompanying drawings: Figure 1 is a longitudinal section of my improved filter, with some of the pulp omitted; Fig. 2 is a horizontal section, partly broken away, on line 2—2, Fig. 1, and Fig. 3 a detail of some of the filtering cells, showing them collapsed.

A cylindrical shell 10 is provided with a cover 11 and a bottom 12 connected by bolts 13. Within shell 10 are contained a number of annular filter cells 14 charged with a suitable filtering pulp 15. Each cell 14 is composed of an outer circular rim 16, an inner eye 17 and an upper screen or perforated top plate 18 rigidly connected to said rim, but disconnected from the eye. As shown, screen 18 is secured to rim 16 by an angle plate 19, and is used in connection with a second top screen 20, which is finer-meshed than screen 18. Each cell is further provided with a perforated bottom plate or lower screen 21 which is not attached to rim 16, but is attached to eye 17 by means of a flange 22. This bottom screen is also used in connection with a second finer-meshed bottom screen 23.

It will be seen that when top pressure is applied to any one cell, its top screens, together with rim 16, will be lowered against the bottom screens, thereby reducing the height of the cell and compressing the pulp contained therein. During this movement, the top screens will be guided along eye 17, while the bottom screens will be guided along rim 16. In order to prevent the parts from becoming disconnected when the cell is expanded, rim 16 is provided with inwardly extending lugs 24 that project beneath the bottom screens.

The cells constructed as described are superposed within shell 10 and their relative size is such that the eye and rim of any one cell are smaller in diameter than those of the cell immediately superimposed, so that thereby the cells may be made to telescope one another.

Between the cells are alternately formed inwardly and outwardly opening liquid passages 25, 26. Of these, the inwardly opening passages 25 are provided at their outer ends with annular closing gaskets 27, while the outwardly opening passages 26 are provided with similar gaskets 28 at their inner ends, the gaskets 27, 28 being preferably soldered to the screens 18, 21, between which they are interposed. These screens are further connected to each other near the inner ends of passages 25, and near the outer ends of passages 26, by rivets 29, so that in this way the bottom screen of any one cell is properly spaced from, but connected to the top screen of the cell next above.

The lowermost cell 14 is supported upon props 30 projecting upwardly from bottom 12, and upon the upper edge of a centrally arranged outlet pipe 31. This pipe extends some distance above bottom 12, to receive the downwardly prolonged eye 17 of lowermost cell 14. In addition to outlet pipe 31, bottom 12 is provided with an inlet pipe 32, which communicates with the free space in shell 10 beneath the lowermost cell 14.

The upwardly prolonged eye of the uppermost cell 14 is received by the recessed central section $33^a$ of a plunger 33 vertically movable in shell 10. This plunger is bolted to the top plate of the uppermost cell and when lowered will cause all the cells to be collapsed by forcing their top plates towards their bottom plates, (Fig. 3), and thereby packing the intervening pulp 15.

I prefer to operate plunger 33 by hydraulic pressure, the water being admitted into a chamber 34, above the plunger, through pipe 35 controlled by cock 36. A central vent 37, passing through cover 11 and plunger 33, permits the escape of air from the apparatus.

In use, plunger 33 is lowered to compress the cells in the manner described and thus pack pulp 15. The liquid to be filtered and admitted through pipe 32, will rise around the cells and flow along passages 26 through the compressed pulp of the contracted cells, and thence out through passages 25, eyes 17 and outlet 31. If the filter is to be washed, plunger 33 is raised to release cells 14, and the wash water is made to flow in a direction opposite to that just described. That is to say, such water enters pipe 31, flows through eyes 17 and passages 25, through the filter cells, to be discharged through passages 26 and pipe 32. By this flow of wash water, not only are all the impurities removed from the screens, but the pulp is loosened, it being free to expand owing to the removal of pressure from the cells. In this way the filter is thoroughly rejuvenated to be again placed into its operative position by the descent of the plunger.

I claim:

1. A filter provided with a plunger, a shell, a battery of inclosed filter cells, each composed of an outer rim, an inner eye, a perforated top plate, and a perforated bottom plate, the top plate being movable relatively to the bottom plate, substantially as specified.

2. A filter provided with a plunger, a shell, a battery of inclosed filter cells, each composed of an outer rim, an inner eye, a perforated top plate, and a perforated bottom plate, the top plate being connected to the rim and disconnected from the eye, and the bottom plate being connected to the eye and disconnected from the rim, substantially as specified.

Signed by me at New York city, (Manhattan,) N. Y., this 25th day of January, 1908.

GEORGE SCHLEMMER.

Witnesses:
GUSTAVE GOLLINZE,
RICHARD HANF.